(12) United States Patent
Utsumi

(10) Patent No.: US 8,420,266 B2
(45) Date of Patent: Apr. 16, 2013

(54) FLAME RETARDANT-CONTAINING NONAQUEOUS SECONDARY BATTERY

(75) Inventor: Hisayuki Utsumi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 186 days.

(21) Appl. No.: 13/001,351

(22) PCT Filed: May 15, 2009

(86) PCT No.: PCT/JP2009/059086
§ 371 (c)(1),
(2), (4) Date: Dec. 23, 2010

(87) PCT Pub. No.: WO2009/157261
PCT Pub. Date: Dec. 30, 2009

(65) Prior Publication Data
US 2011/0104565 A1    May 5, 2011

(30) Foreign Application Priority Data

Jun. 25, 2008 (JP) ................. 2008-166198

(51) Int. Cl.
*H01M 6/16* (2006.01)
(52) U.S. Cl.
USPC .............. 429/328; 429/324; 429/325
(58) Field of Classification Search .......... None
See application file for complete search history.

(56) References Cited

FOREIGN PATENT DOCUMENTS

| JP | 06-013108 | 1/1994 |
|---|---|---|
| JP | 11-329495 | 11/1999 |
| JP | 2002-025615 | 1/2002 |
| JP | 2004-331521 | 11/2004 |
| JP | 2006-024380 | 1/2006 |
| WO | 99/28987 | 6/1999 |
| WO | WO 2005092304 | * 10/2005 |

OTHER PUBLICATIONS

International Search Report for PCT/JP2008/059086, mailed Aug. 11, 2009.
Jacquemin, D., et al., "On the TD-DFT UV/vis Spectra Accuracy: The Azoalkanes," Theor Chem Account, pp. 405-410, Feb. 26, 2008.

* cited by examiner

*Primary Examiner* — Cynthia Walls
(74) *Attorney, Agent, or Firm* — Nixon & Vanderhye, P.C.

(57) ABSTRACT

A nonaqueous secondary battery comprising: a positive electrode; a negative electrode; and a nonaqueous electrolyte solution, wherein the nonaqueous electrolyte solution contains at least a cyclic nitrogen-containing compound represented by the general formula (1):

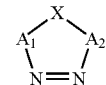

wherein X represents an optionally branched divalent group derived from a chain saturated hydrocarbon and having 1 to 5 carbon atoms, =C=CH$_2$, =C=O, =C=S=O, =O or =S; and A$_1$ and A$_2$ may be the same or different and each represent an optionally substituted methylene group, =C=O or =SO$_2$.

8 Claims, No Drawings

FLAME RETARDANT-CONTAINING NONAQUEOUS SECONDARY BATTERY

This application is the U.S. national phase of International Application No. PCT/JP2009/059086, filed 15 May 2009, which designated the U.S. and claims priority to Japanese Patent Application No. 2008-166198, filed 25 Jun. 2008, the entire contents of each of which are hereby incorporated by reference.

TECHNICAL FIELD

The present invention relates to a flame retardant-containing nonaqueous secondary battery. More particularly, the present invention relates to a flame retardant-containing nonaqueous secondary battery that has battery performance comparable to conventional batteries and that is superior in safety to conventional batteries.

BACKGROUND ART

In recent years, reduction in size and weight of electronic devices has been remarkably progressed, and with the progress, it has been demanded that secondary batteries that are used for such electronic devices should have higher energy density. An example of secondary batteries that can meet the demand is a secondary battery using a nonaqueous electrolyte solution (hereinafter, referred to as nonaqueous secondary battery) such as a lithium-ion secondary battery.

The lithium-ion secondary battery uses a nonaqueous electrolyte solution, and the nonaqueous electrolyte solution comprises an electrolyte salt such as a lithium salt and a nonaqueous solvent. The nonaqueous solvent is desired to have high dielectric constant and high oxidation potential, and to be stable in batteries regardless of operation environment.

As such a nonaqueous solvent, aprotic solvents are used, and known examples thereof include high-permittivity solvents such as cyclic carbonates including ethylene carbonate and propylene carbonate, and cyclic carboxylate esters including γ-butyrolactone; and low-viscosity solvents such as chain carbonates including diethyl carbonate and dimethyl carbonate, and ethers including dimethoxyethane. Usually, a high-permittivity solvent and a low-viscosity solvent are used in combination.

However, the lithium-ion secondary battery using a nonaqueous electrolyte solution may suffer from leakage of the nonaqueous electrolyte solution due to a defect involving increased internal pressure caused by breakage of the battery or any other reason. The leakage of the nonaqueous electrolyte solution may lead to short-circuit between a positive electrode and a negative electrode constituting the lithium-ion secondary battery to cause generation of fire or burning. It may also lead to generation of heat in the lithium-ion secondary battery to cause vaporization and/or decomposition of the organic solvent-based nonaqueous solvent to produce gas. In some cases, the produced gas caught fire or caused rupture of the lithium-ion secondary battery. In order to solve the above-described problems, studies have been carried out to give flame retardancy by adding a flame retardant to the nonaqueous electrolyte solution.

Techniques to add a flame retardant to a nonaqueous electrolyte solution is proposed in Japanese Unexamined Patent Application Publication No. HEI 6(1994)-13108 (Patent Document 1), Japanese Unexamined Patent Application Publication No. 2002-25615 (Patent Document 2), Japanese Unexamined Patent Application Publication (Translation of PCT Application) No. 2001-525597 (Patent Document 3) and Japanese Unexamined Patent Application Publication No. HEI 11(1999)-329495 (Patent Document 4), for example.

As the flame retardant, specifically, Japanese Unexamined Patent Application Publication No. HEI 6(1994)-13108 and Japanese Unexamined Patent Application Publication No. 2002-25615 propose phosphazene derivatives, Japanese Unexamined Patent Application Publication (Translation of PCT Application) No. 2001-525597 proposes azobis(isobutyronitrile) (AIBN), and Japanese Unexamined Patent Application Publication No. HEI 11(1999)-329495 proposes imidazole compounds.

PRIOR ART DOCUMENTS

Patent Documents

Patent Document 1: Japanese Unexamined Patent Application Publication No. HEI 6(1994)-13108
Patent Document 2: Japanese Unexamined Patent Application Publication No. 2002-25615
Patent Document 3: Japanese Unexamined Patent Application Publication (Translation of PCT Application) No. 2001-525597
Patent Document 4: Japanese Unexamined Patent Application Publication No. HEI 11(1999)-329495

DISCLOSURE OF THE INVENTION

Problems to be Solved by the Invention

While producing excellent flame retardancy, phosphazene derivatives are expected to cause unstable operation of the lithium-ion secondary battery at high temperature when used with certain kinds of nonaqueous solvents or blended with a nonaqueous solvent at certain blending ratios. Generally, when the lithium-ion secondary battery produces heat for some reasons, thermal decomposition reaction occurs at an interface between a negative electrode or a positive electrode and the electrolyte solution, and in the case of thermal runaway of this reaction, the lithium-ion secondary battery may be ruptured or catch fire. This phenomenon can occur even when a phosphazene derivative is blended. In addition, since the phosphazene derivative becomes a membrane on the surface of the negative electrode, battery characteristics such as cycle characteristics and environmental stability in operation may be degraded.

In an Example in Japanese Unexamined Patent Application Publication No. 2002-25615, a phosphazene derivative is used in a high content of 40% by volume with respect to a nonaqueous solvent. Since the phosphazene derivative has relatively high viscosity and relatively low dielectric constant, a higher content thereof causes concern about reduction in the electric conductivity of the nonaqueous electrolyte solution and degradation in the battery performance due to the reduction.

Meanwhile, AIBN is less soluble in nonaqueous solvents typified by aprotic solvents, and therefore the content thereof cannot be increased. Accordingly, AIBN may not improve flame retardancy sufficiently. Furthermore, AIBN may be electrolyzed due to charge and discharge of the lithium-ion secondary battery, causing concern about degradation in battery performance.

Likewise, imidazole compounds do not produce sufficient flame retardancy unless the content thereof is increased.

However, an increased content thereof causes concern about degradation in the cycle characteristics and the environmental stability in operation.

It is therefore desired to further improve flame retardancy without degrading battery performance.

Means for Solving the Problems

The inventor of the present invention has made intensive studies about flame retardant for nonaqueous secondary batteries and, as a result, unexpectedly found that a battery is enabled to produce sufficient flame retardancy when a nonaqueous electrolyte solution therein contains a cyclic compound having a nitrogen-nitrogen unsaturated bond in its molecule, to achieve the present invention. As a result of the sufficient flame retardancy thus produced, safety and reliability of the nonaqueous secondary battery can be ensured even when the battery is abnormally heated. Furthermore, this flame retardant does not affect electric characteristics of the nonaqueous secondary battery over a wide temperature range to allow provision of a nonaqueous secondary battery showing stable cycle characteristics.

The present invention therefore provides a nonaqueous secondary battery comprising: a positive electrode; a negative electrode; and a nonaqueous electrolyte solution, wherein the nonaqueous electrolyte solution contains at least a cyclic nitrogen-containing compound represented by the general formula (1):

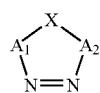

[Formula 1]

wherein X represents an optionally branched divalent group derived from a chain saturated hydrocarbon and having 1 to 5 carbon atoms, $=C=CH_2$, $=C=O$, $=C=S=O$, $=O$ or $=S$; and $A_1$ and $A_2$ may be the same or different and each represent an optionally substituted methylene group, $=C=O$ or $=SO_2$.

The present invention further provides a flame retardant for a nonaqueous secondary battery, the flame retardant comprising the cyclic nitrogen-containing compound described above.

Effects of the Invention

According to the present invention, the nonaqueous electrolyte solution is allowed to contain a cyclic compound having a nitrogen-nitrogen unsaturated bond in its molecule, and thereby the nonaqueous secondary battery is enabled to produce sufficient flame retardancy. As a result, risk of thermal runaway can be reduced even in an abnormal situation such as where the internal temperature of the nonaqueous secondary battery rises due to short-circuit, overcharge or any other reasons. In addition, this cyclic compound has less impact on electric characteristics of the nonaqueous secondary battery including cycle characteristics. Accordingly, it is possible to provide a nonaqueous secondary battery improved in safety and reliability.

Furthermore, because of the above-described effects, it is possible to provide a flame retardant for a nonaqueous secondary battery, the flame retardant being capable of improving the safety and the reliability of the nonaqueous secondary battery.

MODE FOR CARRYING OUT THE INVENTION

A nonaqueous secondary battery of the present invention comprises: a positive electrode; a negative electrode; and a nonaqueous electrolyte solution, and the nonaqueous electrolyte solution contains at least a cyclic nitrogen-containing compound having a structure represented by the following general formula (1).

The inventor believes that the mechanism for the cyclic nitrogen-containing compound used in the present invention as the flame retardant to exert flame retardancy is as follows: in the case of thermal runaway, which starts fire, of the nonaqueous secondary battery, thermal decomposition is caused to generate nitrogen ($N_2$) gas and, as a result, reduce the ambient oxygen concentration thereby to extinguish the fire (anoxic extinction). In order to achieve such a mechanism, the cyclic nitrogen-containing compound is required to have a double bond between nitrogen atoms (azo bond).

The cyclic nitrogen-containing compound usable in the present invention is represented by the general formula (1):

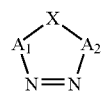

[Formula 2]

In the formula (1), X represents an optionally branched divalent group derived from a chain saturated hydrocarbon and having 1 to 5 carbon atoms, $=C=CH_2$, $=C=O$, $=C=S=O$, $=O$ or $=S$. By selecting one out of the above-mentioned substituents as X, both the flame retardancy and the battery performance can be highly achieved.

Examples of the divalent group derived from a chain saturated hydrocarbon include linear and branched groups. Examples of the linear divalent group include methylene group, ethylene group, trimethylene group, tetraethylene group and pentaethylene group. Examples of the branched divalent group include methyl methylene group, ethyl methylene group, methyl ethylene group, ethyl ethylene group, methyl trimethylene group, ethyl trimethylene group and methyl tetramethylene group. Preferably, these divalent groups are linear. The linear divalent groups are advantageous in that they can give better flame retardancy and they can be readily synthesized.

$A_1$ and $A_2$ may be the same or different and each represent an optionally substituted methylene group, $=C=O$ or $=SO_2$.

Examples of the substituent for the methylene group include a halogen atom, a lower alkyl group, a lower alkoxy group, an ester group, an optionally substituted cycloalkyl group and an optionally substituted aryl group. When $A_2$ is a methylene group, specifically, the cyclic nitrogen-containing compound is represented by the general formula (2):

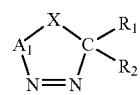

[Formula 3]

In the formula (2), X and $A_1$ are as defined in the general formula (1).

$R_1$ and $R_2$ may be the same or different and each represent hydrogen atom, a halogen atom, a lower alkyl group, a lower alkoxy group, an ester group, an optionally substituted cycloalkyl group or an optionally substituted aryl group.

When $A_2$ in the general formula (2) is also methylene group, the cyclic nitrogen-containing compound is represented by the general formula (3):

[Formula 4]

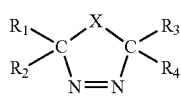

In the formula (3), X, $R_1$ and $R_2$ are as defined in the general formula (2).

$R_3$ and $R_4$ may be the same or different and each represent hydrogen atom, a halogen atom, a lower alkyl group, a lower alkoxy group, an ester group, an optionally substituted cycloalkyl group or an optionally substituted aryl group.

Examples of the halogen atom include fluorine atom, chlorine atom and bromine atom. Of these, chlorine atom or fluorine atom is preferable, and chlorine atom is particularly preferable.

Examples of the lower alkyl group includes an alkyl group having 1 to 4 carbon atoms such as, in particular, methyl group, ethyl group, n-propyl group, isopropyl group, n-butyl group, isobutyl group, sec-butyl group and tert-butyl group.

Examples of the lower alkoxy group include an alkyl group having 1 to 4 carbon atoms that is attached via a single end ether bond such as, in particular, methoxy group, ethoxy group, n-propoxy group, isopropoxy group, n-butoxy group, isobutoxy group, sec-butoxy group and tert-butoxy group.

Examples of the ester group include an alkyl group having 1 to 4 carbon atoms that is attached via a single end ether bond.

Examples of the cycloalkyl group include a cycloalkyl group having 3 to 6 carbon atoms such as, in particular, cyclopropyl group, cyclobutyl group, cyclopentyl group and cyclohexyl group. Examples of the substituent for the cycloalkyl group include halogen atoms such as chlorine atom and fluorine atom, and a lower alkyl group having 1 to 4 carbon atoms.

Examples of the aryl group include phenyl group and naphthyl group. Examples of the substituent for the aryl group include halogen atoms such as chlorine atom and fluorine atom, and a lower alkyl group having 1 to 4 carbon atoms.

For the purpose of highly achieving both the flame retardancy and the battery performance, $R_1$ to $R_4$ are each preferably selected from hydrogen atom, chlorine atom, an alkyl group having 1 to 4 carbon atoms, an alkoxy group having 1 to 4 carbon atoms and a cycloalkyl group. Further, for the purpose of more highly achieving both the flame retardancy and battery performance, $R_1$ to $R_4$ are each preferably selected from hydrogen atom, chlorine atom, methyl group, ethyl group, methoxy group, ethoxy group, methyl ester group, ethyl ester group, cyclopropyl group, cyclobutyl group, cyclopentyl group, cyclohexyl group.

In addition, when $R_1$ to $R_4$ are substituents of different kinds, the positions of the substituents are not particularly limited. For example, when two substituents of one kind and two substituents of another kind are included, $R_1$ and $R_2$ may be the same substituent, and $R_3$ and $R_4$ may be the same substituent, or $R_1$ and $R_2$ may be different substituents, and $R_3$ and $R_4$ may be different substituents. Furthermore, a mixture of constitutional isomers may be used.

When X is a divalent group derived from a chain saturated hydrocarbon, the cyclic nitrogen-containing compound is represented by the general formula (4):

[Formula 5]

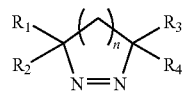

In the formula (4), n represents an integer from 1 to 5, and $R_1$ to $R_4$ are as defined in the general formula (3).

Solubility of the cyclic nitrogen-containing compound in an aprotic solvent can be controlled by controlling, for example, the kinds of $R_1$ to $R_4$ and the ring size. Thus, the cyclic nitrogen-containing compound is enabled to have no effect on the electric characteristics of the nonaqueous secondary battery in a normal situation and to be decomposed to generate nitrogen gas thereby to control thermal runaway in an abnormal situation. The solubility can be increased by increasing the number of carbon atoms of $R_1$ to $R_4$, using an aromatic group or increasing the ring size, for example. Furthermore, the solubility in a nonaqueous solvent can be increased also by selecting $=C=CH_2$, $=C=O$, $=C=S=O$ or $=S$ as X.

Moreover, the cyclic nitrogen-containing compound is enabled to have no effect on the electric characteristics of the nonaqueous secondary battery in a normal situation and to be decomposed to generate nitrogen gas thereby to control thermal runaway in an abnormal situation, when the groups as $A_1$ and $A_2$ are selected from the above-mentioned kinds.

The cyclic nitrogen-containing compound produces nitrogen gas when heated at a temperature higher than its decomposition temperature. The decomposition temperature is preferably 100° C. or more higher than normal ambient temperature where the nonaqueous secondary battery is used, in particular, 100° C. to 300° C., and more preferably 140° C. to 250° C. When the difference between the decomposition temperature and the normal ambient temperature is less than 100° C., the cyclic nitrogen-containing compound may be decomposed during normal use, and in this case, the electric characteristics of the nonaqueous secondary battery will be degraded. Here, the decomposition temperature can be controlled by controlling the ring size and substituent effects.

The cyclic nitrogen-containing compound can be obtained by, for example, cyclizing a dibromo derivative using hydrazine to obtain a diaziridine derivative and dehydrogenating the diaziridine derivative using a dehydrogenation catalyst (for example, tungstate, molybdate, nickelate) as shown in the following reaction schemes. Of these reaction schemes, the scheme (1), the scheme (2) and the scheme (3) are reaction schemes for the compounds of the general formula (1), the general formula (2) and the general formula (3), respectively.

[Scheme 6]

(1)

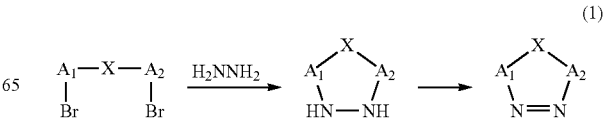

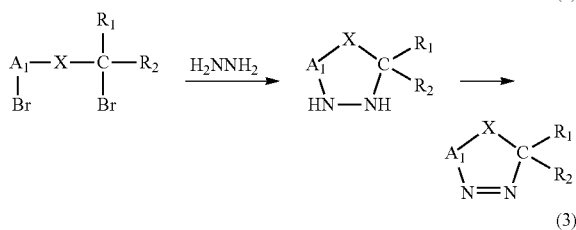

(2)

(3)

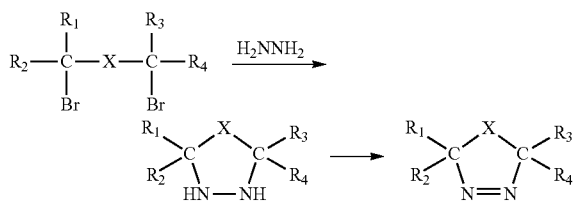

The dibromo derivative can be readily obtained by substituting hydrogen atoms with bromine atoms by a commonly known method.

In addition, the compound of the general formula (4) can be obtained by, for example, cyclizing a diamine derivative in the presence of a dehydrogenation catalyst (for example, tungstate, molybdate, nickelate) as shown in the following scheme:

[Formula 7]

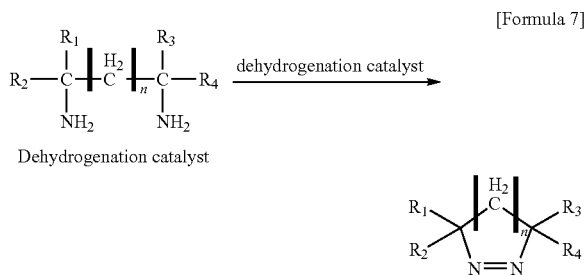

The diamine derivative can be readily obtained by substituting hydroxyl groups of a diol derivative with amino groups by a commonly known method.

The nonaqueous electrolyte solution contains an electrolyte salt, a nonaqueous solvent and, optionally, an additive. The above-described cyclic nitrogen-containing compound can function as a nonaqueous solvent. When the cyclic nitrogen-containing compound by itself can provide a nonaqueous electrolyte solution having sufficient properties, therefore, no additional organic solvent needs to be used. However, in terms of enhancement in charge/discharge characteristics and resistance to low temperature of the nonaqueous secondary battery, the nonaqueous solvent is preferably a mixed solvent with an additional organic solvent.

As the additional organic solvent, aprotic organic solvents can be usually used. Examples of the aprotic solvents include, but not particularly limited to, dimethyl carbonate, diethyl carbonate, ethyl methyl carbonate, dipropyl carbonate, propylene carbonate, ethylene carbonate, butylene carbonate, γ-butyrolactone (α-butyrolactone), γ-valerolactone, tetrahydrofuran, 2-methyltetrahydrofuran, dimethyl sulfoxide, 1,3-dioxolane, formnamide, dimethylformamide, acetonitrile, methyl formate, methyl acetate, diethyl ether, 1,2-dimethoxyethane, 1,2-diethoxyethane, ethoxymethoxyethane, dioxane, sulfolane and methylsulfolane. The organic solvent may be used independently or in combination.

The percentage of the cyclic nitrogen-containing compound to be blended in the nonaqueous electrolyte solution is usually in a range of 1% to 60% (v/v), and preferably in a range of 10% to 40% by volume fraction. When the percentage is less than 1%, rupture and generation of fire of the nonaqueous secondary battery may not be sufficiently inhibited. On the other hand, when the percentage is more than 60%, the performance of the nonaqueous secondary battery may be deteriorated in a low-temperature environment.

As the electrolyte salt, a lithium salt is usually used. The lithium salt is not particularly limited, as long as it dissolves in the nonaqueous solvent. Examples thereof include $LiClO_4$, LiCl, $LiBF_4$, $LiPF_6$, $LiAsF_6$, $LiSbF_6$, $LiN(SO_2CF_3)_2$, $LiC(SO_2CF_3)_2$, lower aliphatic carboxylic acid, chloroborane lithium and 4-phenyllithium borate. The lithium salt can be used independently or in combination. The amount of the electrolyte salt to be added is preferably 0.1 mol to 3 mol, and more preferably 0.5 mol to 2 mol with respect to 1 kg of the nonaqueous solvent.

Examples of the additive include conventionally known dehydrators and deoxidizers. Specific examples thereof include vinylene carbonate, fluoroethylene carbonate, trifluoropropylene carbonate, phenyl ethylene carbonate, succinic anhydride, glutaric anhydride, maleic anhydride, ethylene sulfite, 1,3-propane sultone, 1,4-butane sultone, methyl methanesulphonate, dibutylsulphide, heptane, octane and cycloheptane. They are usually contained in the nonaqueous solvent at a concentration of 0.1% by weight or more to 5% by weight or less. Then, the capacity maintenance characteristics and the cycle characteristics after storage in a high-temperature environment can be improved.

The positive electrode can be produced by applying, drying and pressurizing a paste containing, for example, an active material of the positive electrode, a conductive material, a binder and an organic solvent on a current collector of the positive electrode. The conductive material in an amount of 1 part by weight to 20 parts by weight, the binder in an amount of 1 part by weight to 15 parts by weight and the organic solvent in an amount of 30 parts by weight to 60 parts by weight can be blended with respect to 100 parts by weight of the active material of the positive electrode.

Examples of the active material of the positive electrode usable here include lithium complex oxides such as $LiNiO_2$, $LiCoO_2$ and $LiMn_2O_4$; and compounds obtained by substituting one or more elements in these oxides with other elements (for example, Fe, Si, Mo, Cu and Zn).

Examples of the conductive material include carbonaceous materials such as acetylene black and ketjen black.

Examples of the binder include polyvinylidene fluoride (PVdF), polyvinyl pyridine and polytetrafluoroethylene.

Examples of the organic solvent include N-methyl-2-pyrrolidone (NMP) and N,N-dimethylformamide (DMF).

Examples of the current collector of the positive electrode include a foil or a thin sheet of a conductive metal such as SUS and aluminum.

The negative electrode can be produced by applying, drying and pressurizing a paste containing, for example, an active material of the negative electrode, a conductive material, a binder and an organic solvent on a current collector of the negative electrode. The conductive material in an amount of 1 part by weight to 15 parts by weight, the binder in an amount of 1 part by weight to 10 parts by weight and the organic solvent in an amount of 40 parts by weight to 70 parts by weight can be blended with respect to 100 parts by weight of the active material of the negative electrode.

Examples of the active material of the negative electrode include pyrolyzed carbons, cokes, graphites, glassy carbons, sintered organic polymer compounds, carbon fibers and activated carbons.

Examples of the conductive material include carbonaceous materials such as acetylene black and ketjen black.

Examples of the binder include polyvinylidene fluoride, polyvinyl pyridine and polytetrafluoroethylene.

Examples of the organic solvent include N-methyl-2-pyrrolidone (NMP) and N,N-dimethylformamide (DMF).

Examples of the current collector of the negative electrode include a foil of a metal such as copper.

Usually, a separator is interposed between the negative electrode and the positive electrode.

The material of the separator is usually a porous film, selected in view of solvent resistance and reducibility resistance. Suitable examples thereof include a porous film and a nonwoven fabric of a polyolefin resin such as polyethylene and polypropylene. The film and the nonwoven fabric of such materials may be used as a single layer or multiple layers. In the case of multiple layers, it is preferable that at least one sheet of a nonwoven fabric is used in view of the cycle characteristics, performance at low temperature and load characteristics.

The separator is arbitrarily interposed between the negative electrode and the positive electrode, and then a nonaqueous electrolyte solution is injected thereto to obtain a nonaqueous secondary battery. In addition, this nonaqueous secondary battery, as a unit, may be stacked into multiple layers.

Other than those mentioned, generally used and commonly known members can be used to constitute the nonaqueous secondary battery.

In addition, the form of the nonaqueous secondary battery is not particularly limited, and examples thereof include various forms such as a button type, a coin type, a rectangular type, a cylinder type having a spiral structure and a laminate type, which can be varied in size such as a thin type and a large size according to use.

EXAMPLES

Hereinafter, the present invention will be described in detail with reference to examples and comparative examples; however, the present invention is not limited to the following examples and comparative examples at all.

Example 1

To 80 ml of a mixed solvent of ethylene carbonate and diethylene carbonate (mixing ratio (volume ratio): ethylene carbonate/diethylene carbonate=1/2) (aprotic organic solvent), 20 ml of a cyclic nitrogen-containing compound represented by the following formula (Formula 8) (a six-membered ring compound represented by the general formula (3), wherein $R_1$ to $R_4$ represent methyl groups, X represents a hydrocarbon group having 2 carbon atoms (ethylene group), (a flame retardant for nonaqueous secondary batteries, 3,3,6,6-tetramethyl-3,4,5,6-tetrahydropyridazine, decomposition temperature: 146° C.) was added. In the mixed solvent obtained, $LiPF_6$ as a lithium salt was dissolved at a concentration of 1.0 mol/kg to prepare a nonaqueous electrolyte solution.

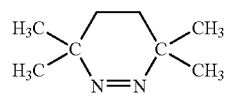

[Formula 8]

$LiMn_2O_4$ as an active material of the positive electrode in an amount of 100 parts by weight, acetylene black as a conductive material in an amount of 5 parts by weight, PVdF as a binder in an amount of 5 parts by weight and NMP as a solvent in an amount of 40 parts by weight were kneaded for dispersion with a planetary mixer to prepare a paste for positive electrode formation. The paste prepared was applied with a coater uniformly onto both sides of a band-like aluminum foil having a thickness of 20 μm constituting a current collector of the positive electrode. Here, an end portion of the aluminum foil was left uncoated for connection of a terminal. The coat was dried under vacuum at 130° C. for 8 hours to remove the solvent, and then pressed by using a hydraulic press machine to form a positive plate. The positive plate obtained was cut into a predetermined size for use.

A natural powdered graphite manufactured in China as an active material of the negative electrode (average particle diameter: 15 μm) in an amount of 100 parts by weight, vapor grown carbon fiber (VGCF) powder (VGCF, high-bulk-density product by Showa Denko K.K. Corporation) as a conductive material in an amount of 2 parts by weight, PVdF as a binder in an amount of 2 parts by weight and NMP as a solvent in an amount of 50 parts by weight were kneaded for dispersion with a planetary mixer to prepare a paste for negative electrode formation. The paste prepared was applied with a coater uniformly onto both sides of a copper foil having a thickness of 10 μm constituting a current collector of the negative electrode. Here, an end portion of the copper foil was left uncoated for connection of a terminal. Further, the coat was dried under vacuum at 100° C. for 8 hours to remove the solvent, and then pressed by using a hydraulic press machine to form a negative plate. The negative plate obtained was cut into a predetermined size for use.

The positive and negative plates obtained were stacked to form a laminate with a polypropylene porous film as a separator interposed therebetween, and then the nonaqueous electrolyte solution was injected into the laminate to produce a nonaqueous secondary battery.

Example 2

A nonaqueous secondary battery was produced in the same manner as in Example 1 except that the amount of the mixed solvent of ethylene carbonate and diethylene carbonate was changed to 99 ml, and the amount of the cyclic nitrogen-containing compound was changed to 1 ml.

Example 3

A nonaqueous secondary battery was produced in the same manner as in Example 1 except that the amount of the mixed solvent of ethylene carbonate and diethylene carbonate was changed to 40 ml, and the amount of the cyclic nitrogen-containing compound was changed to 60 ml.

Example 4

A nonaqueous secondary battery was produced in the same manner as in Example 1 except that the six-membered ring compound was changed to a five-membered ring compound represented by the following formula (Formula 9), that is, a cyclic nitrogen-containing compound represented by the general formula (3), wherein X represents a hydrocarbon group having 1 carbon atom (methylene group), and two of $R_1$ to $R_4$ represent hydrogen atoms, and the others represent chlorine atoms (dichloro-4,5-dihydro-3H-pyrazole, decomposition temperature: 179° C.). Here, used as the five-membered ring compound was a mixture of a compound in which $R_1$ and $R_3$ are hydrogen atoms, and $R_2$ and $R_4$ are chlorine atoms; and a compound in which $R_1$ and $R_4$ are hydrogen atoms, and $R_2$ and $R_3$ are chlorine atoms.

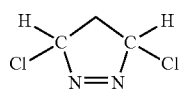

[Formula 9]

Example 5

A nonaqueous secondary battery was produced in the same manner as in Example 1 except that the six-membered ring compound was changed to a nine-membered ring compound represented by the following formula (Formula 10), that is, a cyclic nitrogen-containing compound represented by the general formula (3), wherein X represents a hydrocarbon group having 5 carbon atoms (pentamethylene group), and $R_1$ to $R_4$ represent hydrogen atoms (4,5,6,7,8,9-hexahydro-3H-[1,2]diazonine, decomposition temperature: 192° C.).

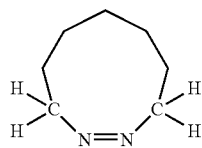

[Formula 10]

Example 6

A nonaqueous secondary battery was produced in the same manner as in Example 1 except that the cyclic nitrogen-containing compound was changed to a cyclic nitrogen-containing compound represented by the following formula (Formula 11), (a five-membered ring compound represented by the general formula (1), wherein X represents an oxygen atom, $A_1$ and $A_2$ represent carbon atoms, and $R_1$ to $R_4$ represent methyl groups (2,2,5,5-tetramethyl-1,3,4-oxadiazoline, decomposition temperature: 127° C.)).

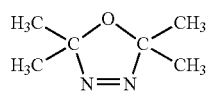

[Formula 11]

Example 7

A nonaqueous secondary battery was produced in the same manner as in Example 1 except that the cyclic nitrogen-containing compound was changed to a cyclic nitrogen-containing compound represented by the following formula (Formula 12) (a five-membered ring compound represented by the general formula (3), wherein X represents =C=O, and $R_1$ to $R_4$ represent methyl groups (3,3,5,5-tetramethyl-1-pyrazole-4-one, decomposition temperature: 141° C.)).

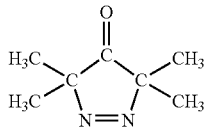

[Formula 12]

Example 8

A nonaqueous secondary battery was produced in the same manner as in Example 1 except that the cyclic nitrogen-containing compound was changed to a cyclic nitrogen-containing compound represented by the following formula (Formula 13), (a five-membered ring compound represented by the general formula (1), wherein X represents methylene group, and $A_1$ and $A_2$ represent =$SO_2$ ([1,4,2,3]dithiadiazole-1,1,4,4-tetroxide, decomposition temperature: 187° C.)).

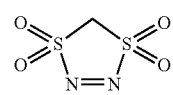

[Formula 13]

Example 9

A nonaqueous secondary battery was produced in the same manner as in Example 1 except that the cyclic nitrogen-containing compound was changed to a cyclic nitrogen-containing compound represented by the following formula (Formula 14), (a five-membered ring compound represented by the general formula (2), wherein X represents methylene group, $A_1$ represents =$SO_2$, and $R_1$ and $R_2$ represent methyl groups (4,4-dimethyl-4,5-dihydro-[1,2,3]thiadiazole-1,1-dioxide, decomposition temperature: 162° C.)).

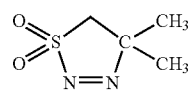

[Formula 14]

Comparative Example 1

A nonaqueous secondary battery was produced in the same manner as in Example 1 except that the six-membered ring compound was changed to a ten-membered ring compound represented by the following formula (Formula 15), that is, a cyclic nitrogen-containing compound represented by the general formula (3), wherein X represents a hydrocarbon group having 6 carbon atoms, and $R_1$ to $R_4$ represent hydrogen atoms (3,4,5,6,7,8,9,10-octahydro-[1,2]diazecine, decomposition temperature: 206° C.).

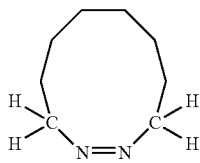

[Formula 15]

Comparative Example 2

A nonaqueous secondary battery was produced in the same manner as in Example 1, except that no cyclic nitrogen-containing compound was used.

Comparative Example 3

A nonaqueous secondary battery was produced in the same manner as in Example 1 except that the amount of the mixed solvent of ethylene carbonate and diethylene carbonate was changed to 98 ml, and 2 ml of azobisisobutyronitrile (AIBN) was used instead of the cyclic nitrogen-containing compound.

Comparative Example 4

A nonaqueous secondary battery was produced in the same manner as in Example 1 except that the amount of the mixed solvent of ethylene carbonate and diethylene carbonate was changed to 90 ml, and 10 ml of 1-ethyl-3-methylimidazolium/hexafluorophosphate anion (EMI-HF) was used instead of the cyclic nitrogen-containing compound.

(Method for Testing Battery Performance)

The nonaqueous secondary batteries obtained in Examples 1 to 9 and Comparative Examples 1 to 4 were measured for the initial discharge capacity and the discharge capacity retention at 20° C. and 60° C., and tested for the safety by a nail penetration test as follows.

(1) Measurement for Initial Discharge Capacity at 20° C.

The capacity measured after each nonaqueous secondary battery is charged up to 4.2 V at a rate of 0.1 CmA, and then discharged down to 3.0 V at a rate of 0.1 CmA is determined as the initial discharge capacity (mAh/g). The measurement is performed in an incubator set to a constant temperature of 20° C.

(2) Measurement for Discharge Capacity Retention at 20° C.

A cycle of charging each nonaqueous secondary battery up to 4.2 V at a rate of 1 CmA and discharging the battery down to 3.0 V at a rate of 1 CmA is repeated 99 times, and then a cycle of charging and discharging under the same condition as in the measurement for the initial discharge capacity is completed for the 100th time, whereupon the battery is measured for the capacity.

After completion of the measurement for the 100th time, a cycle of charging each nonaqueous secondary battery up to 4.2 V at a rate of 1 CmA and discharging the battery down to 3.0 V at a rate of 1 CmA is repeated 399 times, and then a cycle of charging and discharging under the same condition as in the measurement for the initial discharge capacity is completed for the 500th time in total, whereupon the battery is measured for the capacity.

The discharge capacity retention (%) at the 100th cycle and the discharge capacity retention (%) at the 500th cycle are defined as the percentage of the initial discharge capacity accounted for by the discharge capacity at the 100th cycle and the percentage of the initial discharge capacity accounted for by the discharge capacity at the 500th cycle, respectively. The measurement is performed in an incubator set to a constant temperature of 20° C.

(3) Initial Discharge Capacity and Discharge Capacity Retention at 60° C.

The measurement for the initial discharge capacity (mAh/g) and the discharge capacity retention (%) at 60° C. are performed in the same manner as in the measurement for the initial discharge capacity and the discharge capacity retention at 20° C. except that the temperature of the incubator is set to a constant temperature of 60° C.

(4) Nail Penetration Test

As the nail penetration test, a nail having a diameter of 3 mm is driven into each nonaqueous secondary battery having been charged up to 4.2 V at a rate of 0.1 CmA so that the nail penetrates the battery at a speed of 1 mm/s at a room temperature of 20° C. to observe the state of the battery.

Table 1 shows the test results.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Non-aqueous electrolyte solution | electrolyte salt | Type | LiPF6 | LiPF6 | LiPF6 | LiPF6 | LiPF6 | LiPF6 | LiPF6 | LiPF6 | LiPF6 |
| | Non-aqueous solvent | Type (Vol. ratio) (V/V %) | EC/DEC (1/2) 80 | EC/DEC (1/2) 99 | EC/DEC (1/2) 40 | EC/DEC (1/2) 80 | EC/DEC (1/2) 80 | EC/DEC (1/2) 80 | EC/DEC (1/2) 80 | EC/DEC (1/2) 80 | EC/DEC (1/2) 80 |
| | Cyclic N-containing compound | Type (V/V %) | Formula 8 20 | Formula 8 1 | Formula 8 60 | Formula 9 20 | Formula 10 20 | Formula 11 20 | Formula 12 20 | Formula 13 20 | Formula 14 20 |
| Electric characteristics 20° C. | Initial | DC* (mAh/g) | 118.2 | 120.1 | 116.5 | 116.9 | 114.7 | 118.3 | 118.2 | 119.1 | 117.8 |
| | 100$^{th}$ cycle | DC* (mAh/g) DCR** (%) | 115.8 98 | 118.9 99 | 111.8 96 | 115.7 99 | 109.0 95 | 113.2 96 | 112.9 96 | 117.2 98 | 115.8 98 |
| | 500$^{th}$ cycle | DC* (mAh/g) DCR** (%) | 106.4 90 | 109.3 91 | 101.4 87 | 102.8 88 | 97.5 85 | 105.1 89 | 106.1 90 | 110.9 93 | 108.4 92 |
| Electric characteristics 60° C. | Initial | DC* (mAh/g) | 117.5 | 118.9 | 115.4 | 115.7 | 113.2 | 117.0 | 118.0 | 119.2 | 118.2 |
| | 100$^{th}$ cycle | DC* (mAh/g) DCR** (%) | 106.9 91 | 109.4 92 | 102.7 89 | 106.4 92 | 99.6 88 | 106.0 91 | 107.0 91 | 111.7 94 | 111.2 94 |
| | 500$^{th}$ cycle | DC* (mAh/g) DCR** (%) | 94.0 80 | 97.5 82 | 87.7 76 | 91.4 79 | 83.7 74 | 94.1 80 | 99.1 84 | 105.1 88 | 103.9 88 |
| | Nail penetration test | | NAE*** | NAE*** | NAE*** | NAE*** | NAE*** | NAE*** | NAE*** | NAE*** | NAE*** |

TABLE 1-continued

|  |  |  | Comparative Examples | | | |
|---|---|---|---|---|---|---|
|  |  |  | 1 | 2 | 3 | 4 |
| Non-aqueous electrolyte solution | electrolyte salt | Type | LiPF6 | LiPF6 | LiPF6 | LiPF6 |
|  | Non-aqueous solvent | Type | EC/DEC | EC/DEC | EC/DEC | EC/DEC |
|  |  | (Vol. ratio) | (1/2) | (1/2) | (1/2) | (1/2) |
|  |  | (V/V %) | 80 | 100 | 98 | 90 |
|  | Cyclic N-containing compound | Type | Formula 15 | — | AIBN | EMI-HF |
|  |  | (V/V %) | 20 | — | 2 | 10 |
| Electric characteristics 20° C. | Initial | DC* (mAh/g) | 110.5 | 115.3 | 91.2 | 112.4 |
|  | 100$^{th}$ cycle | DC* (mAh/g) | 99.5 | 106.1 | 82.1 | 104.1 |
|  |  | DCR** (%) | 90 | 92 | 90 | 93 |
|  | 500$^{th}$ cycle | DC* (mAh/g) | 88.4 | 94.1 | 68.4 | 93.3 |
|  |  | DCR** (%) | 80 | 82 | 75 | 83 |
| Electric characteristics 60° C. | Initial | DC* (mAh/g) | 101.6 | 112.6 | — | 115.8 |
|  | 100$^{th}$ cycle | DC* (mAh/g) | 71.2 | 89.0 | — | 92.6 |
|  |  | DCR** (%) | 70 | 79 | — | 80 |
|  | 500$^{th}$ cycle | DC* (mAh/g) | 57.9 | 68.0 | — | 83.4 |
|  |  | DCR** (%) | 57 | 61 | — | 72 |
|  | Nail penetration test |  | NAE*** | NAE*** | SF**** | SF**** |

DC*: Discharge Capacity
DCR**: Discharge Capacity Retention
NAE***: No abnormal event
SF****: Smoke and fire Table 1 shows that the general nonaqueous secondary battery using a general organic solvent as a nonaqueous solvent and containing no flame retardant (Comparative Example 2) experienced generation of smoke and generation of fire in the nail penetration test. On the other hand, the nonaqueous secondary batteries each having a cyclic nitrogen-containing compound added to a nonaqueous solvent (Examples 1 to 9) did not experience abnormal events such as generation of smoke and generation of fire in the nail penetration test. Furthermore, with respect to the battery performance, the nonaqueous secondary batteries of Examples 1 to 9 are in no way inferior to the general nonaqueous secondary battery of Comparative Example 2.

In addition, the nonaqueous secondary battery of Comparative Example 1 using a cyclic nitrogen-containing compound having a ten-membered ring compound did not experience abnormal events such as generation of smoke and generation of fire in the nail penetration test as in the case of Examples 1 to 9. With respect to the battery performance, however, the battery of Comparative Example 1 was inferior to the general nonaqueous secondary battery of Comparative Example 2. When heated to 60° C., in particular, the battery performance of Comparative Example 1 is significantly inferior to that of Examples 1 to 5.

Furthermore, Comparative Example 3 shows that the non-aqueous secondary battery using AIBN deteriorated in the cycle characteristics due to electrolysis of AIBN when charged and discharged at 20° C., and failed to exert stable electric characteristics due to thermal decomposition of AIBN when charged and discharged at 60° C. In addition, the batteries of Comparative Examples 3 and 4 experienced generation of smoke and generation of fire in the nail penetration test. That is, with the nonaqueous secondary batteries using a commonly known flame retardant such as AIBN and imidazole compounds, it is impossible to prevent deterioration in the battery performance during charging and discharging and ensure flame retardancy in the abnormal situation at the same time.

As described above, Table 1 shows that it is possible to obtain a nonaqueous secondary battery improved in the flame retardancy and comparable in the electric characteristics to a conventional one by using a cyclic nitrogen-containing compound having a specific structure as a flame retardant in a nonaqueous electrolyte solution.

Synthesis of Cyclic Nitrogen-Containing Compounds of Examples 1 to 5 and Comparative Example 1

The cyclic nitrogen-containing compounds of Examples 1 to 5 and Comparative Example 1 were obtained as described below according to the following synthesis scheme:

[Formula 16]

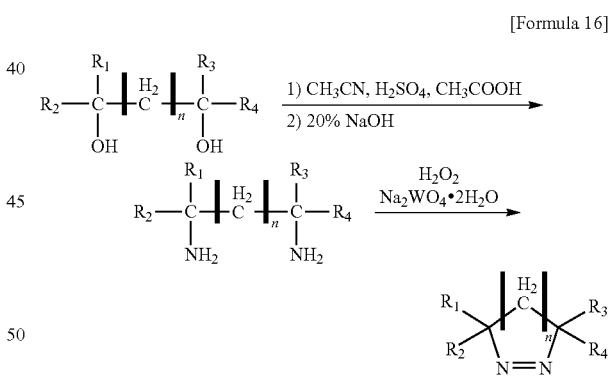

To a three-necked flask having a stirrer, a dropping funnel and a cooling tube, 18.1 g (0.44 mol) of acetonitrile, 200 ml of glacial acetic acid and 40 g of concentrated sulfuric acid were added and the outside of the flask was ice-cooled. Next, 58.4 g (0.40 mol) of a diol derivative (2,5-dimethylhexane-2,5-diol) was slowly added dropwise under stirring. After completion of the dropping, the resulting solution was stirred for 24 hours, dissolved in 500 ml of water and rendered alkaline with sodium carbonate. The resulting solution was extracted with ether. The solvent was distilled off to obtain an acetamide derivative. The acetamide derivative was added to 600 ml of an ethylene glycol solution of 20% sodium hydroxide and refluxed for 48 hours. After completion of the reaction, the reaction solution was distilled at a temperature of 180° C. or less, and the distillatory solution was extracted with ether. After drying, the solvent was distilled off to obtain 30.6 g of a diamine derivative (2,5-dimethylhexane-2,5-diamine) (yield 53.2%).

In a three-necked flask having a stirrer, a dropping funnel and a cooling tube, 28.8 g (0.20 mol) of the diamine derivative obtained was dissolved in 500 ml of a mixed solution of water and ethanol (mixing ratio: 1:1), and 0.66 g (0.002 mol) of sodium tungstate dihydrate was added thereto to be heated to approximately 60° C. Next, 90 ml of 35% hydrogen peroxide aqueous solution was gradually added dropwise. After completion of the dropping, the resulting solution was stirred at a temperature of 78° C. to 80° C. for approximately 2 hours, and then cooled to room temperature. After completion of the reaction, an organic layer obtained through extraction with chloroform was concentrated, and then subjected to vacuum distillation to obtain 12.1 g of a cyclic nitrogen-containing compound (yield 43.1%). The cyclic nitrogen-containing compound obtained was measured for NMR and IR to give the following values:

$^1$H-NMR (ppm, CDCl$_3$) δ; 1.56 (s, 4H), 1.29 (s, 12H)

IR; ν(KBr) cm$^{-1}$; 2966, 2893, 1576, 1303, 1242, 1131, 1004, 962

The values confirmed that the cyclic nitrogen-containing compound obtained was 3,3,6,6-tetramethyl-3,4,5,6-tetrahydropyridazine.

The cyclic nitrogen-containing compounds (Example 4: dichloro-4,5-dihydro-3H-pyrazole; Example 5: 4,5,6,7,8,9-hexahydro-3H-[1,2]diazonine; Comparative Example 1: 3,4,5,6,7,8,9,10-octahydro-[1,2]diazecine) were obtained in the same manner as in Example 1 except that the diol derivative was changed to 1,3-dichloropropan-1,3-diol in Example 4, to heptane-1,7-diol in Example 5, and to octane-1,8-diol in Comparative Example 1, respectively.

Synthesis of Cyclic Nitrogen-Containing Compounds of Example 6

The cyclic nitrogen-containing compound of Example 6 was obtained as described below according to the following synthesis scheme:

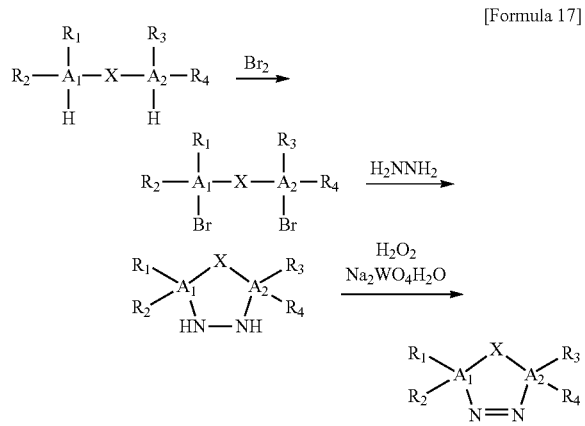

[Formula 17]

In a three-necked flask having a stirrer and a dropping funnel, 61.3 g (0.6 mol) of a starting material was dissolved in 150 ml of chloroform, and the outside of the flask was ice-cooled. Next, 105 g (0.66 mol) of bromine was slowly added dropwise under stirring. After completion of the dropping, the resulting solution was stirred for approximately 1 hour, washed with water, washed with an Na$_2$CO$_3$ aqueous solution, and then washed with water. The solvent was distilled off to obtain 139 g of a dibromo derivative (yield 90.0%).

In a three-necked flask having a stirrer, a dropping funnel and a cooling tube having been placed under a nitrogen atmosphere, 14.4 g (0.45 mol) of hydrazine anhydrous and ml of absolute ethanol were added and stirred. Next, 129 g (0.5 mol) of a dibromo derivative was slowly added dropwise. After completion of the dropping, the resulting solution was refluxed for approximately 1 hour, and then distilled to obtain 48.4 g of a diaziridine derivative (yield 82.7%).

In a three-necked flask having a stirrer, a dropping funnel and a cooling tube, 39 g (0.3 mol) of the diaziridine derivative obtained was dissolved in 500 ml of a mixed solution of water and ethanol (mixing ratio: 1:1), and 0.99 g (0.003 mol) of sodium tungstate dihydrate was added thereto to be heated to approximately 60° C. Next, 90 ml of 35% hydrogen peroxide aqueous solution was gradually added dropwise. After completion of the dropping, the resulting solution was stirred at a temperature of 78° C. to 80° C. for approximately 2 hours, and then cooled to room temperature. After completion of the reaction, an organic layer obtained through extraction with chloroform was concentrated, and then subjected to vacuum distillation to obtain 16.4 g of a cyclic nitrogen-containing compound (yield 42.7%). The cyclic nitrogen-containing compound obtained was measured for NMR and IR to give the following values:

$^1$H-NMR (ppm, CDCl$_3$) δ; 1.37 (s, 12H)

IR; ν(KBr) cm$^{-1}$; 3081, 1952, 1390, 1242, 943, 522

The values confirmed that the cyclic nitrogen-containing compound obtained was 2,2,5,5-tetramethyl-1,3,4-oxadiazoline.

Synthesis of Cyclic Nitrogen-Containing Compounds of Examples 7 to 9

The cyclic nitrogen-containing compounds were obtained in the same manner as in Example 6 except that the starting material was changed to 2,4-dimethyl-3-pentanone in Example 7, to methanedisulfonyl dichloride in Example 8, and to 2-chloro-2-methylpropane sulfonyl chloride in Example 9, respectively.

The invention claimed is:

1. A nonaqueous secondary battery comprising: a positive electrode; a negative electrode; and a nonaqueous electrolyte solution, wherein the nonaqueous electrolyte solution contains at least a cyclic nitrogen-containing compound represented by the general formula (1):

[Formula 1]

wherein X represents an optionally branched divalent group derived from a chain saturated hydrocarbon and having 1 to 5 carbon atoms, =C=CH$_2$, =C=O, =C=S=O, =O or =S; and A$_1$ and A$_2$ may be the same or different and each represent an optionally substituted methylene group, =C=O or =SO$_2$.

2. The nonaqueous secondary battery according to claim 1, wherein the cyclic nitrogen-containing compound is represented by the general formula (2):

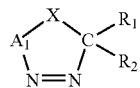

[Formula 2]

wherein X and $A_1$ are as defined in the general formula (1); and $R_1$ and $R_2$ may be the same or different and each represent hydrogen atom, a halogen atom, a lower alkyl group, a lower alkoxy group, an ester group, an optionally substituted cycloalkyl group or an optionally substituted aryl group.

3. The nonaqueous secondary battery according to claim 2, wherein the cyclic nitrogen-containing compound is represented by the general formula (3):

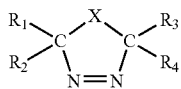

[Formula 3]

wherein X, $R_1$ and $R_2$ are as defined in the general formula (2); and $R_3$ and $R_4$ may be the same or different and each represent hydrogen atom, a halogen atom, a lower alkyl group, a lower alkoxy group, an ester group, an optionally substituted cycloalkyl group or an optionally substituted aryl group.

4. The nonaqueous secondary battery according to claim 3, wherein the cyclic nitrogen-containing compound is represented by the general formula (4):

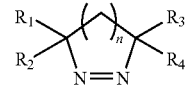

[Formula 4]

wherein n represents an integer from 1 to 5, and $R_1$ to $R_4$ are as defined in the general formula (3).

5. The nonaqueous secondary battery according to claim 1, wherein the cyclic nitrogen-containing compound is contained in the nonaqueous electrolyte solution in a percentage of 1% to 60% by volume.

6. The nonaqueous secondary battery according to claim 1, wherein the cyclic nitrogen-containing compound produces nitrogen gas when heated at a temperature higher than its decomposition temperature.

7. The nonaqueous secondary battery according to claim 6, wherein the cyclic nitrogen-containing compound has a decomposition temperature of 120° C. to 250° C.

8. The nonaqueous secondary battery according to claim 3, wherein $R_1$ to $R_4$ represent methyl groups or phenyl groups.

* * * * *